US012633144B2

(12) United States Patent
Chen et al.

(10) Patent No.: US 12,633,144 B2
(45) Date of Patent: May 19, 2026

(54) SYSTEM AND METHOD FOR TRAINING A MULTI-VIEW 3D OBJECT DETECTION FRAMEWORK

(71) Applicant: Toyota Research Institute, Inc., Los Altos, CA (US)

(72) Inventors: Dian Chen, Mountain View, CA (US); Rares A. Ambrus, San Francisco, CA (US); Jie Li, Los Altos, CA (US); Adrien David Gaidon, Mountain View, CA (US); Vitor Campagnolo Guizilini, Santa Clara, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 403 days.

(21) Appl. No.: 18/140,208

(22) Filed: Apr. 27, 2023

(65) Prior Publication Data

US 2024/0233408 A1 Jul. 11, 2024

Related U.S. Application Data

(60) Provisional application No. 63/437,204, filed on Jan. 5, 2023.

(51) Int. Cl.
*G06V 20/64* (2022.01)
*G06V 10/77* (2022.01)
(Continued)

(52) U.S. Cl.
CPC .......... *G06V 20/64* (2022.01); *G06V 10/7715* (2022.01); *G06V 10/774* (2022.01); *G06V 10/82* (2022.01); *G06V 10/95* (2022.01)

(58) Field of Classification Search
CPC .. G06V 20/64; G06V 10/7715; G06V 10/774; G06V 10/82; G06V 10/95
See application file for complete search history.

(56) References Cited

U.S. PATENT DOCUMENTS

2020/0320401 A1* 10/2020 Jampani ................. G06N 3/047
2021/0150757 A1* 5/2021 Mustikovela ............ G06N 3/08
(Continued)

OTHER PUBLICATIONS

Carion et al. "End-to-End Object Detection with Transformers." arXiv:2005.12872v3 [cs.CV] May 28, 2020.
(Continued)

*Primary Examiner* — Emily C Terrell
(74) *Attorney, Agent, or Firm* — Christopher G. Darrow; Darrow Mustafa PC

(57) ABSTRACT

Systems and methods for training multi-view 3D object detection frameworks are disclosed herein. In one example, a method includes the steps of predicting one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, determining a viewpoint equivariance loss based on a comparison of the one or more predicted bounding boxes with one or more ground truth bounding boxes, and adjusting model weights of networks forming the multi-view 3D object detection framework based on the viewpoint equivariance loss.

18 Claims, 6 Drawing Sheets

(51) Int. Cl.

| | |
|---|---|
| *G06V 10/774* | (2022.01) |
| *G06V 10/82* | (2022.01) |
| *G06V 10/94* | (2022.01) |

(56) References Cited

U.S. PATENT DOCUMENTS

| | | | |
|---|---|---|---|
| 2023/0230332 A1* | 7/2023 | Stoddart | G06T 7/70 |
| | | | 345/419 |
| 2024/0419382 A1* | 12/2024 | Dekel | G06V 20/70 |
| 2025/0131685 A1* | 4/2025 | Fidler | G06V 10/764 |
| 2025/0131700 A1* | 4/2025 | Fidler | G06V 20/56 |

OTHER PUBLICATIONS

Philion et al. "Lift, Splat, Shoot: Encoding Images from Arbitrary Camera Rigs by Implicitly Unprojecting to 3D." arXiv:2008.05711v1 [cs.CV] Aug. 13, 2020.

Li et al. "PETR: Position Embedding Transformation for Multi-view 3D Object Detection." arXiv preprint arXiv:2203.05625 (2022). https://arxiv.org/pdf/2203.05625.pdf.

Li et al. "BEVDepth: Acquisition of Reliable Depth for Multi-view 3D Object Detection." arXiv preprint arXiv:2206.10092 (2022). https://arxiv.org/pdf/2206.10092.pdf.

Wang et al. "Detr3d: 3d object detection from multi-view images via 3d-to-2d queries." arXiv:2110.06922v1 [cs.CV] Oct. 13, 2021.

Isaac-Medina et al. "Multi-View Vision Transformers for Object Detection." pp. 180-191. PMLR, 2022. https://dro.dur.ac.uk/36304/1/36304.pdf.

* cited by examiner

SYSTEM AND METHOD FOR TRAINING A MULTI-VIEW 3D OBJECT DETECTION FRAMEWORK

CROSS-REFERENCE TO RELATED APPLICATION

This application claims priority to U.S. Provisional Patent Application No. 63/437,204 filed Jan. 5, 2023, the contents of which are hereby incorporated by reference in its entirety.

TECHNICAL FIELD

The subject matter described herein relates, in general, to systems and methods for training object detection frameworks.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Camera-based 3D object detection may be used in robotic systems, including vehicles that can operate autonomously or semi-autonomously. Generally, one or more cameras are mounted to the robotic system. The cameras collect images, which are then processed to determine the location, position, and possibly other information of detected objects. This information may then be utilized by downstream processes that control the functioning of the robotic system.

SUMMARY

This section generally summarizes the disclosure and is not a comprehensive explanation of its full scope or all its features.

In one embodiment, a method for training a multi-view 3D object detection framework includes the steps of predicting one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, determining a viewpoint equivariance loss based on a comparison of the one or more predicted bounding boxes with one or more ground truth bounding boxes, and adjusting model weights of networks forming the multi-view 3D object detection framework based on the viewpoint equivariance loss.

In another embodiment, a system for training a multi-view 3D object detection framework includes a processor and a memory in communication with the module. The memory includes a training module that includes instructions that, when executed by the processor, cause the processor to predict one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, determine a viewpoint equivariance loss based on a comparison of the one or more predicted bounding boxes with one or more ground truth bounding boxes, and adjust model weights of networks forming the multi-view 3D object detection framework based on the viewpoint equivariance loss.

In yet another embodiment, a non-transitory computer-readable medium stores instructions for training a multi-view 3D object detection framework. The instructions, when executed by a processor, cause the processor to predict one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, determine a viewpoint equivariance loss based on a comparison of the one or more predicted bounding boxes with one or more ground truth bounding boxes, and adjust model weights of networks forming the multi-view 3D object detection framework based on the viewpoint equivariance loss.

Further areas of applicability and various methods of enhancing the disclosed technology will become apparent from the description provided. The description and specific examples in this summary are intended for illustration only and not to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
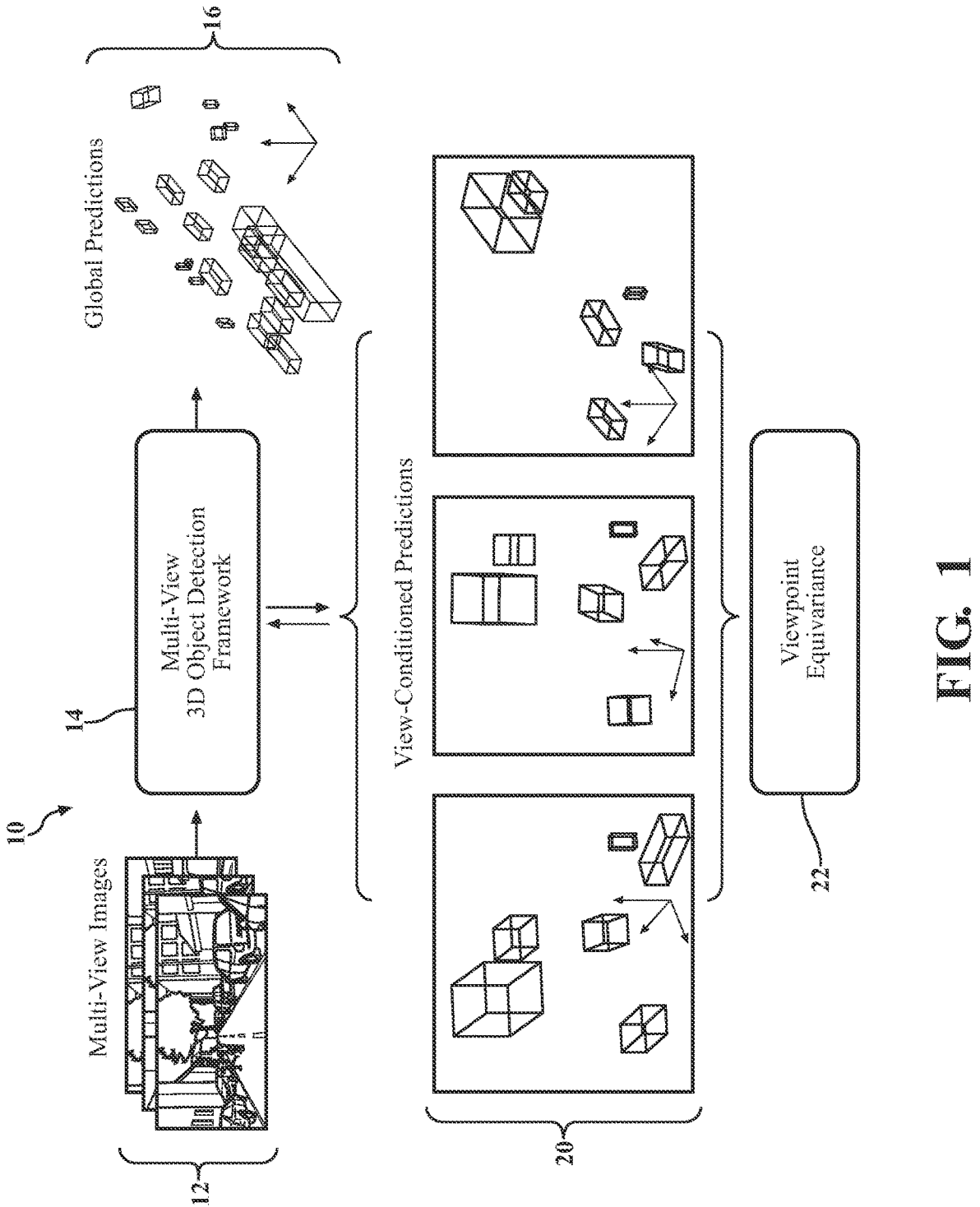
FIG. 1 illustrates a general overview of the process flow of the multi-view 3D object detection framework.

Described is a 3D object detection framework that exploits 3D multi-view geometry to improve localization through viewpoint awareness and equivariance. With reference to FIG. 1, a summary of a process flow 10 is shown. Moreover, the process flow 10 illustrates that multi-view images 12 are provided to the multi-view 3D object detection framework 14. The multi-view 3D object detection framework 14 encodes the 3D scene from multi-view images 12 and decodes objects with view-conditioned queries to output 3D bounding boxes 16 that identify object information of objects within the multi-view images 12.

Predicted 3D bounding boxes are expressed in the underlying views of the queries, which enables enforcement of viewpoint equivariance 22 among predictions from multiple views 20. Virtual query views are generated during training and, with the viewpoint equivariance regularization, bring richer geometric learning signals to guide the model to better understand the 3D structure in the scene. During inference, the 3D bounding boxes 16 can be obtained by choosing the global frame as the query view.

Figure 2:
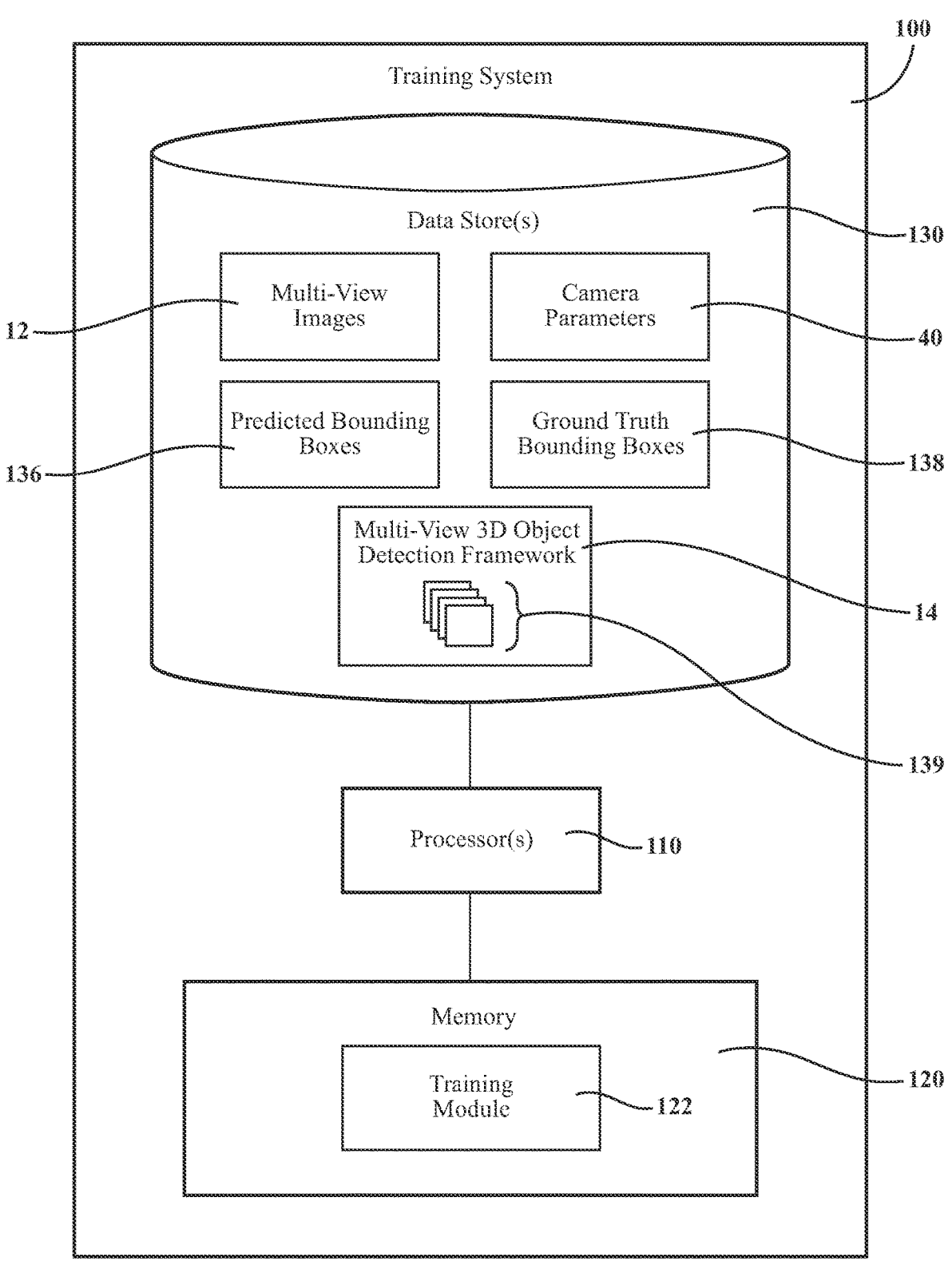
FIG. 2 illustrates a system for training a multi-view 3D object detection framework.

FIG. 2 illustrates a training system 100 for training the multi-view 3D object detection framework 14. The training system 100 is one example of a training system that may be used to train the multi-view 3D object detection framework 14. In this example, the training system 100 includes one or more processor(s) 110. Accordingly, the processor(s) 110 may be a part of training system 100 or the training system 100 may access the processor(s) 110 through a data bus or another communication path. In one or more embodiments, the processor(s) 110 is an application-specific integrated circuit that is configured to implement functions associated with a training module 122, which stores computer-readable instructions for performing the training of the multi-view 3D object detection framework 14.

In general, the processor(s) 110 is an electronic processor, such as a microprocessor, capable of performing various functions described herein. In one embodiment, the training system 100 includes a memory 120 that stores training module 122. The memory 120 may be a random-access memory (RAM), read-only memory (ROM), a hard disk drive, a flash memory, or other suitable memory for storing the training module 122. As mentioned briefly before, the training module 122 is, for example, computer-readable instructions that, when executed by the processor(s) 110, cause the processor(s) 110 to perform the various functions disclosed herein.

Furthermore, in one embodiment, the training system 100 includes one or more data store(s) 130. The data store(s) 130 is, in one embodiment, an electronic data structure such as a database that is stored in the memory 120 or another memory and that is configured with routines that can be executed by the processor(s) 110 for analyzing stored data, providing stored data, organizing stored data, and so on. Thus, in one embodiment, the data store(s) 130 stores data used by the training module 122 in executing various functions.

In one embodiment, the data store(s) 130 includes the multi-view 3D object detection framework 14 that is to be trained by the training system 100. As will be explained later, during training, one or more model weights 139 of different neural networks that form the multi-view 3D object detection framework 14 may be adjusted based on a viewpoint equivariance loss. Again, this will be explained later in this description.

In addition, the data store(s) 130 may also include multi-view images 12 that will be provided to the multi-view 3D object detection framework 14. The multi-view images 12 are a collection of images taken from cameras at different viewing angles of a scene. For example, several cameras may be positioned to capture a scene. Images captured from these cameras represent multiple views of the scene and are therefore referred to as multi-view images 12. The data store(s) 130 may also include predicted bounding boxes 136 that are by the multi-view 3D object detection framework 14 by processing the multi-view images 12. Further still, the data store(s) 130 may also include other information, such as camera parameters 40 of the cameras utilized to capture the multi-view images 12 and ground truth bounding boxes 138 that are utilized to generate the viewpoint equivariance loss. It should be understood that the data stored within the data store(s) 130 are just examples of some data types that may be stored.

It should also be understood that different and/or more types of data may also be stored within the data store(s) 130 that allow the training system 100 to properly train the multi-view 3D object detection framework 14. Therefore, any other information mentioned in this description can also be stored within the data store(s) 130.

Figure 3:
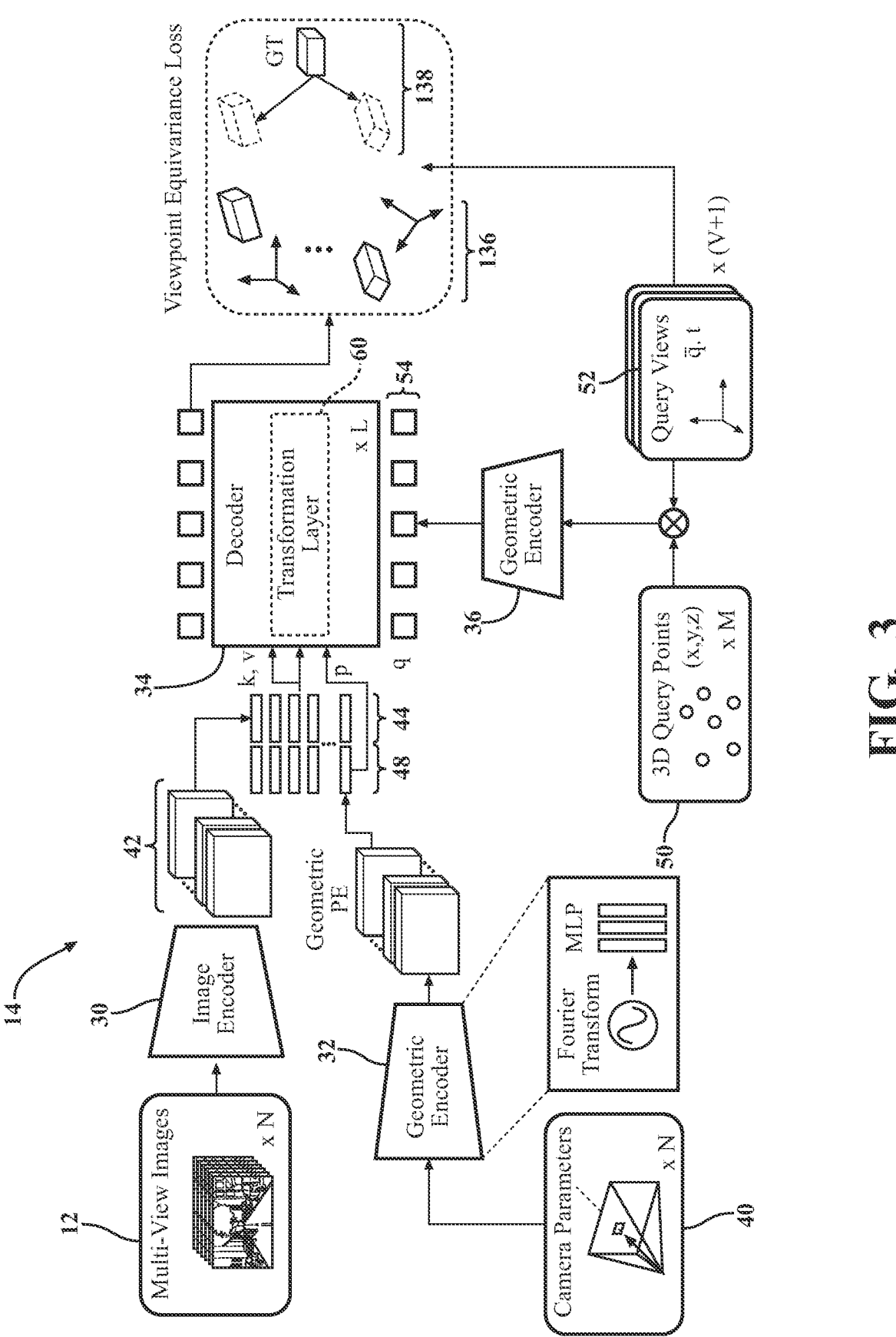
FIG. 3 illustrates a detailed view of a multi-view 3D object detection framework.

As mentioned, the training module 122 includes instructions for training the multi-view 3D object detection framework 14. To better understand how this training occurs, reference is made to FIG. 3, which illustrates an example of the multi-view 3D object detection framework 14. The multi-view 3D object detection framework 14 employs viewpoint-aware parameterization in the encoding and decoding stages of a transformer-based architecture.

At the outset, the instructions within the training module 122 cause the processor(s) 110 to extract image features 42 $\{F_i \in \mathbb{R}^{C \times H' \times W'}\}$ of the multi-view images 12 using an image encoder 30. Additionally, the instructions within the training module 122 cause the processor(s) 110 to generate geometric positional encodings 48 by using a geometric positional encoding network 32 that jointly considers pixel location of the associated feature embeddings, camera pose of multi-view cameras that captured the multi-view images, and intrinsics of the multi-view cameras, illustrated is camera parameters 40. The pixel location may be a 3D viewing ray originating from a camera center and pointing to the image feature. The 3D viewing ray can be calculated from the intrinsics of the camera used to capture the image.

For each of the extracted image features 42 $\{F_i\}$, the training module 122 cause the processor to construct a triplet of geometric attributes, referred to as feature embeddings 44, $[r_{(u_i,v_i)}, \vec{q}_i, t_i]$ at each feature location $(u_i, v_i)$. $[\vec{q}_i, t_i]$ denotes the quaternion vector and translation of the camera pose, and $r(u_i, v_i)$ denotes an inverse perspective projection ray originating from the pixel location given by:

$$r'_{(u_i,v_i)} = \left(K_i R_i^T\right)^{-1} [\alpha u_i, \alpha v_i, 1]^T, \tag{1}$$

$$r = \frac{r'}{\|r'\|_2}$$

where $\alpha$ is the downsample factor of Fi compared to image $I_i$, $K_i$, and $R_i$ are the intrinsic and rotation matrix of camera i. The triplet $[r_{(u_i,v_i)}, \vec{q}_i, t_i]$ fully describes the perspective geometry for a given image feature $F_i (u_i, v_i)$.

The extracted geometric triplet may be encoded into high-dimensional embeddings via a learnable mapping. In one example, a Fourier transform may be applied to capture the fine-grained changes in the geometric attributes.

$$\gamma(x \mid [f_1, \ldots, f_k]) = [\sin(f_1 \pi x), \cos(f_1 \pi x), \ldots] \tag{2}$$

The k frequencies $[f_1, \ldots, f_k]$ are sampled evenly between $[0, f_{max}]$. Afterward, the geometric positional encoding network 32, which may be a multilayer perceptron neural network, is used to project the output to dimension C as the final geometric positional encoding:

$$p^e_{(u_i, v_i)} = MLP_{enc}\left(\gamma\left(\left[r_{(u_i, v_i)}, \vec{q}_i, t_i\right]\right)\right) \tag{3}$$

As a result, even without explicitly projecting the image features $\{F_i\}$ back to 3D space, they become 3D geometry aware when augmented with the 3D geometric positional encodings $\{P_i^e \in \mathbb{R}^{C \times H \times W'}\}$. Hence, the multi-view perception of the scene at an input level is implicitly encoded, which will work jointly with the learning objective to enforce 3D geometric modeling.

In a multi-sweep setting, the camera pose is transformed from previous frames into the current global coordinate via ego-motion compensation. The image features from previous frames are combined with their current frame counterparts as additional cameras.

The multi-view 3D object detection framework 14 includes a decoder network 34 with L transformer layers 60. Each layer performs self-attention among a set of M queries $\{q_j \in \mathbb{R}^C, j=1, 2, \ldots, M\}$, and cross-attention between the queries and the 3D geometry-aware image features $\{(F_i, P_i^e)\}$. The updated queries $\{q_j\}$ will serve as input to the next layer:

$$\{q_j\}_l = \psi_{l-1}\left(\{F_i\}, \{P_i^e\}, \{q_j\}_{l-1}\right), \tag{4}$$

$$l = 1, 2, \ldots, L$$

where L is the number of attention layers. A classification and regression MLP heads map the queries from each layer into class logits and bounding box predictions, respectively.

$$\hat{s}_j = MLP_{cls}(q_j), \tag{5}$$

$$\hat{b}_j = MLP_{reg}(q_j).$$

The instructions within the training module 122 cause the processor(s) 110 to generate view-dependent queries 54 using a query encoding network 36 that considers learnable 3D query points 50 combined with a given query view 52. As to the learnable 3D query points 50, a set of M learnable 3D query points $\{c_j \in \mathbb{R}^3, j=1, 2, \ldots, M\}$ are initialed in the global timeframe $T^0$ and are optimized during training.

Regarding the query views 52, a query view $T^v = [\vec{q}^v, t^v]$ is selected relative to the global frame. To construct the query, the 3D query points are first transformed into the query view via $c_j^v = (T^v)^{-1} c_j$ and with the query view $[c_j^v, \vec{q}^v, t^v]$ compose the query geometries. The query geometries are similarly mapped by a Fourier transform followed by a query encoding network 36, which may be an MLP, into view-conditioned queries:

$$q_j^v = MLP_{dec}\left(\gamma\left(\left[c_j^v, \vec{q}^v, t^v\right]\right)\right). \tag{6}$$

For query views, the global frame $T^0 = [[1, 0, 0, 0], \vec{0}]$ is referred to as a default query view. In this view coordinate, the predictions are expected to be decoded in the Bird-Eye-View (BEV) coordinate. Additionally, V virtual query views are generated to provide variation to the decoding views and encourage viewpoint awareness in the model. Euler angles $\Theta^v \in \mathbb{R}^3$ are randomly sampled, and translation $t^v \in \mathbb{R}^3$ from uniform distributions $[\Theta_{min}, \Theta_{max}]$ and $[t_{min}, t_{max}]$, after which the Euler angles will be converted to the equivalent quaternion $\vec{q}^v \in SO(3)$, giving $\{T_{virtual}^v = [\vec{q}^v, t^v]\}$. In total, there are V+1 query views consisting of the global frame and V virtual views $\{T^v\} = \{T_{virtual}^v\} \cap \{T^0\}$. Therefore, given the M 3D query points $\{c_j\}$ and V+1 query views $\{T^v\}$, object queries are constructed from $\{c_j\} \times \{T^v\}$, resulting in total $M \times (V+1)$ individual object queries.

The query view specifies the expected coordinate system for the predicted bounding box by the query. Specifically, given a view-conditioned query $q_j^v$, the box predictions $\hat{b}_j^v$ are local to the underlying query view $T^v$, parameterized as:

$$\hat{b}_j^v = \left[\Delta \hat{c}_j^v, \hat{d}_j, \cos(\phi), \sin(\phi), \hat{v}_j^v\right], \tag{7}$$

where $\Delta \hat{c}_j^v \in \mathbb{R}^3$ is the offset from the 3D query point $c_j^v$ to the bounding box center, $\hat{d}_j \in \mathbb{R}^3$ is the box dimensions, $\phi$ is the yaw angle of the box, and $\hat{v}_j^v \in \mathbb{R}^3$ is the box velocity. In contrast to the bounding boxes, one single object classification score is decoded from the global frame for each query point cj, sj (c) is the probability of the object belonging to category c normalized by a sigmoid function.

The view-conditioned queries and their local predictions serve as a form of data augmentation during training and enable viewpoint equivariance regularization. It should be understood that More design choices are also possible. In this example, only the global frame $T^0$ is used as the query view at inference time.

Figure 4:
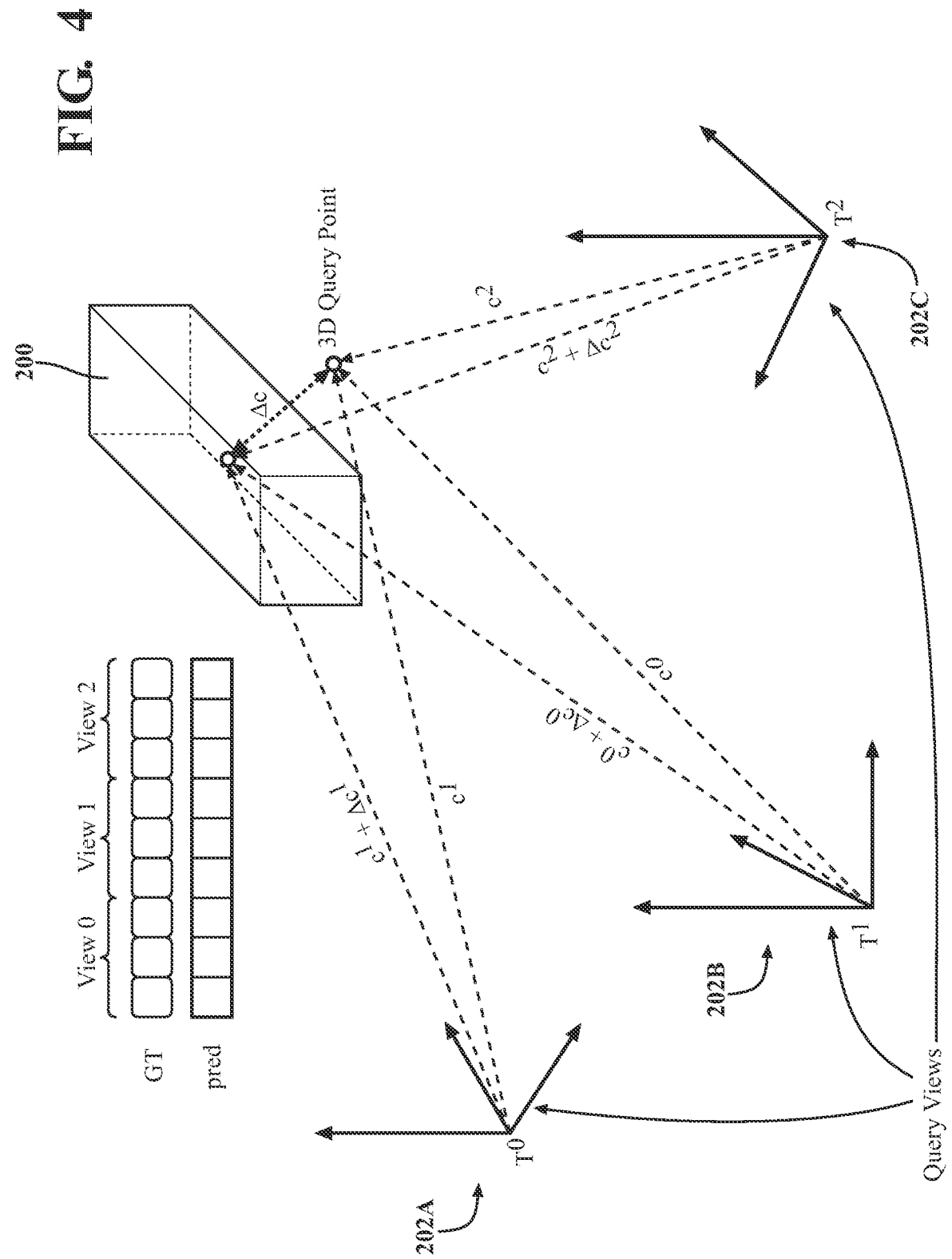
FIG. 4 illustrates an example of a relative transformation that illustrates how multi-view consistency is enforced at training time.

The instructions within the training module 122 cause the processor(s) 110 to determine the viewpoint equivariance loss. Broadly, this is based on a comparison of the predicted bounding boxes 136 with ground truth bounding boxes 138. More specifically, given V+1 query views, there are V+1 versions of bounding box predictions 136 $\{\hat{b}_j^v\}$ coming from a single query point $c_j$. The V+1 predicted bounding boxes 136 are expected to be the expression from different query views of the same underlying ground truth bounding boxes 138. Moreover, according to multi-view geometry, the observations of the same object from different frames should be geometrically consistent. For example, referring to FIG. 4, the observations of the box 200 in different views 202A, 202B, and 202C should only differ by the relative transformation. Therefore, when a 3D query point is paired with multiple query views to construct queries, the predictions in each respective view are combined to match and regress the ground truth counterparts jointly.

To ensure that the V+1 versions predictions from query point $c_j$ are assigned to the same ground truth object, a super box may be created concatenating the predictions from different query views:

$$B_j = \left[\hat{b}_j^0, \hat{b}_j^1, \ldots, \hat{b}_j^v\right]. \tag{8}$$

Similarly, the ground truth bounding boxes are extended into super boxes:

$$B_m^* = \left[ g_m^0, g_m^1, \ldots, g_m^v \right], \tag{9}$$

where $$g_m^0$$

is the ground truth bounding box in the global frame, and $$g_m^v$$

are the converted bounding box into the query views.

A Hungarian matching is performed to decide the optimal assignment between $\{B_j\}$ and $\{B_m^*\}$, using the following cost function:

$$\sigma = -\mathbb{1}_{\{c_m \neq \emptyset\}} \log \left( s_j(c_m) \right) + \mathbb{1}_{\{c_m \neq \emptyset\}} L_{reg} \left( B_m^*, \hat{B}_j \right) \tag{10}$$

where $c_m$ is the ground truth class label, and $L_{reg}(\ )$ is a weighted L1 loss, given by:

$$L_{reg}(B_m^*, B_j) = \left\| \hat{b}_j^0 - g_m^0 \right\|_1 + \sum_1^V \lambda_v \left\| \hat{b}_j^v - g_m^v \right\|_1. \tag{11}$$

$\lambda_v$ is used to weigh the virtual views. Once the optimal assignment is identified, the loss on the super boxes is calculated by:

$$L_{VE} = \lambda_{cls} L_{cls}(s, c) + \lambda_{reg} L_{reg}(B^*, B), \tag{12}$$

for each paired prediction and ground truth.

Focal loss is adapted for classification loss Les, and the same form of regression loss $L_{reg}$ as in matching. $\lambda_{cls}$ and $\lambda_{reg}$ are loss weights. For each 3D query point, by considering V+1 versions of predictions jointly during matching and optimization, the model learns viewpoint equivariance through multi-view consistency, leading to better 3D detection.

Once the viewpoint equivariance loss is determined, the instructions within the training module 122 cause the processor(s) 110 to adjust one or more model weights 139 of any of the models utilized by the multi-view 3D object detection framework 14. These models can include the image encoder 30, the geometric positional encoding network 32, the decoder network 34, the query encoding network 36, and/or any other models forming the multi-view 3D object detection framework 14. As such, the multi-view 3D object detection framework 14, as described herein, learns from viewpoint equivariance regularization. The view-conditioning of queries allows the enforcement of viewpoint equivariance on predictions made from different views, which allows for superior learning signals to guide the multi-view 3D object detection framework 14 in better understanding the 3D structure of the scene.

Figure 5:
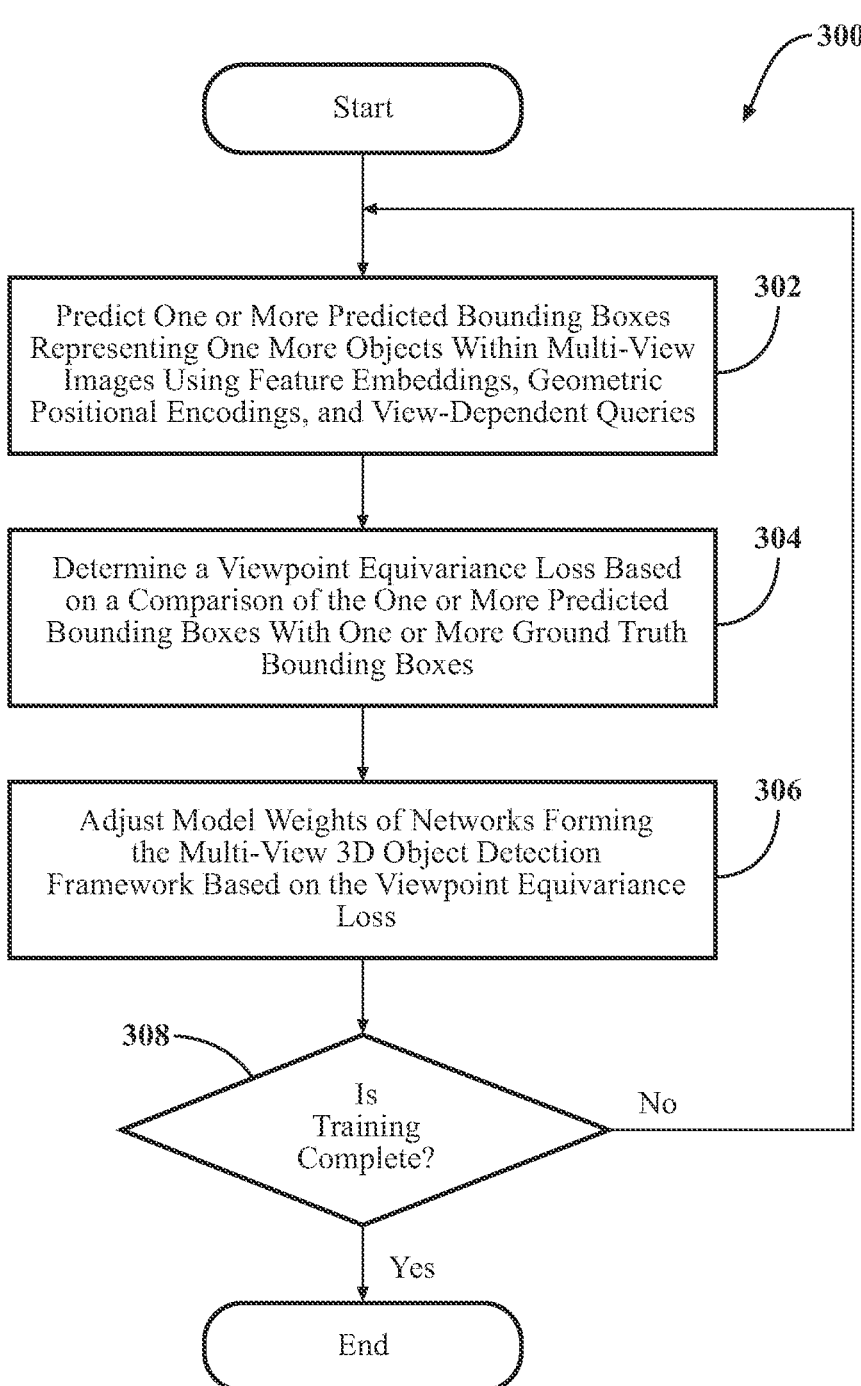
FIG. 5 illustrates a method for training a multi-view 3D object detection framework.

Referring to FIG. 5, a method 300 for training the multi-view 3D object detection framework 14 is shown. The method 300 will be described from the viewpoint of the training system 100 of FIG. 2 and the multi-view 3D object detection framework 14 of FIG. 3. However, it should be understood that this is just one example of implementing the method 300. While method 300 is discussed in combination with the training system 100, it should be appreciated that the method 300 is not limited to being implemented within the training system 100, but is instead one example of a system that may implement the method 300. Additionally, it should be understood that much of the method 300 was previously described when describing the training system 100 and that any description regarding the training system 100 can be applied to the method 300.

The method 300 begins with step 302, wherein the training module 122 includes instructions that, when executed by the processor(s) 110, cause the processor(s) 110 to predict one or more predicted bounding boxes 136 representing one or more objects within multi-view images 12 using a decoder network 34 that considers (a) feature embeddings 44 generated from image features from multi-view images (b) geometric positional encodings 48 that are associated with the feature embeddings, and (c) view-dependent queries 54.

As mentioned previously, the feature embeddings 44 can be generated using the image encoder 30 that extracts the image features 42 from multi-view images 12 and flattens the image features 42 to become the feature embeddings 44. The geometric positional encodings 48 can be generated by the geometric positional encoding network 32 that jointly considers the pixel location of the associated feature embeddings, camera pose of multi-view cameras that captured the multi-view images, and intrinsics of the multi-view cameras. As mentioned before, the pixel location may be in the form of a 3D viewing ray originating from a camera center and pointing to the image feature.

The view-dependent queries 54 can be generated using the query encoding network 36 that considers learnable 3D query points 50 combined with a given query view 52. View-dependent queries can be updated utilizing the decoder network 34, which includes self-attention layers and cross-attention layers. The self-attention layers perform self-attention among the view-dependent queries 54. The cross-attention layers perform cross-attention between the view-dependent queries 54, the feature embeddings 44, and the geometric positional encodings 48 to generate the updated view-dependent queries.

In step 304, the training module 122 includes instructions that, when executed by the processor(s) 110, cause the processor(s) 110 to determine a viewpoint equivariance loss based on a comparison of the one or more predicted bounding boxes 136 with one or more ground truth bounding boxes 138. As explained in more detail in the prior paragraphs, the viewpoint equivariance loss can be determined by matching the one or more predicted bounding boxes 136 with the same query point combined with multiple query views to one or more ground truth bounding boxes 138 in respective views and pay the viewpoint equivariance loss to enforce multi-view consistency. A feed-forward detection head that may be part of the decoder 34 maps the updated view-dependent queries to one or more predicted bounding boxes 136.

In step 306, the training module 122 includes instructions that, when executed by the processor(s) 110, cause the processor(s) 110 to adjust model weights 139 of networks forming the multi-view 3D object detection framework 14 based on the viewpoint equivariance loss. These networks can include the image encoder 30, the geometric positional encoding network 32, the decoder network 34, and/or the query encoding network 36.

In step 308, the training module 122 includes instructions that, when executed by the processor(s) 110, cause the processor(s) 110 to determine if the training of the multi-view 3D object detection framework 14 is complete. The training may be deemed complete when training data has been exhausted and/or when a set number of cycles have been completed. If the training is complete, the method 300 ends. Otherwise, the method 300 returns to step 302.

The multi-view 3D object detection framework 14 can be utilized in a number of different applications that generally require machine vision. As such, robotic systems, such as autonomous or semi-autonomous vehicles having object detection systems, may utilize the multi-view 3D object detection framework 14. For example, referring to FIG. 6, one example of a vehicle 400 incorporating the multi-view 3D object detection framework 14 within an object detection system 470 is shown. As used herein, a "vehicle" is any form of powered transport. In one or more implementations, the vehicle 400 is an automobile. While arrangements will be described herein with respect to automobiles, it will be understood that embodiments are not limited to automobiles. In some implementations, the vehicle 400 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control.

The vehicle 400 also includes various elements. It will be understood that in various embodiments it may not be necessary for the vehicle 400 to have all of the elements shown in FIG. 6. The vehicle 400 can have any combination of the elements shown in FIG. 6. Further, the vehicle 400 can have additional elements to those shown in FIG. 6. In some arrangements, the vehicle 400 may be implemented without one or more of the elements shown in FIG. 6. While the various elements are shown as being located within the vehicle 400 in FIG. 6, it will be understood that one or more of these elements can be located external to the vehicle 400. Further, the elements shown may be physically separated by large distances and provided as remote services (e.g., cloud-computing services).

In one or more embodiments, the vehicle 400 is an autonomous vehicle. As used herein, "autonomous vehicle" refers to a vehicle that operates in an autonomous mode. "Autonomous mode" refers to navigating and/or maneuvering the vehicle 400 along a travel route using one or more computing systems to control the vehicle 400 with minimal or no input from a human driver. In one or more embodiments, the vehicle 400 is highly automated or completely automated. In one embodiment, the vehicle 400 is configured with one or more semi-autonomous operational modes in which one or more computing systems perform a portion of the navigation and/or maneuvering of the vehicle 400 along a travel route, and a vehicle operator (i.e., driver) provides inputs to the vehicle to perform a portion of the navigation and/or maneuvering of the vehicle 400 along a travel route. Such semi-autonomous operation can include supervisory control implemented by an autonomous driving system 460 to ensure that the vehicle 400 remains within defined state constraints.

The vehicle 400 can include one or more processor(s) 410. In one or more arrangements, the processor(s) 410 can be a main processor of the vehicle 400. For instance, the processor(s) 410 can be an electronic control unit (ECU). The vehicle 400 can include one or more data store(s) 415 for storing one or more types of data. The data store(s) 415 can include volatile and/or non-volatile memory. Examples of data store(s) 415 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 415 can be a component of the processor(s) 410, or the data store(s) 415 can be operatively connected to the processor(s) 410 for use thereby. The term "operatively connected" and/or "in communication with" as used throughout this description, can include direct or indirect connections, including connections without direct physical contact.

In one or more arrangements, the one or more data store(s) 415 can include map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain map(s) 417. The terrain map(s) 417 can include information about the ground, terrain, roads, surfaces, and/or other features of one or more geographic areas. The terrain map(s) 417 can include elevation data in the one or more geographic areas. The map data 416 can be high quality and/or highly detailed. The terrain map(s) 417 can define one or more ground surfaces, which can include paved roads, unpaved roads, land, and other things that define a ground surface.

In one or more arrangements, the map data 416 can include one or more static obstacle map(s) 418. The static obstacle map(s) 418 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 418 can have location data, size data, dimension data, material data, and/or other associated data. The static obstacle map(s) 418 can include measurements, dimensions, distances, and/ or information for one or more static obstacles. The static obstacle map(s) 418 can be high quality and/or highly detailed. The static obstacle map(s) 418 can be updated to reflect changes within a mapped area.

The one or more data store(s) 415 can include sensor data 419. In this context, "sensor data" means any information about the sensors that the vehicle 400 is equipped with, including the capabilities and other information about such sensors. As will be explained below, the vehicle 400 can include the sensor system 420. The sensor data 419 can relate to one or more sensors of the sensor system 420. As an example, in one or more arrangements, the sensor data 419 can include information from the cameras 426 of the sensor system 420.

In some instances, at least a portion of the map data 416 and/or the sensor data 419 can be located in one or more data store(s) 415 located onboard the vehicle 400. Alternatively, or in addition, at least a portion of the map data 416 and/or the sensor data 419 can be located in one or more data store(s) 415 that are located remotely from the vehicle 400.

As noted above, the vehicle 400 can include the sensor system 420. The sensor system 420 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 420 includes a plurality of sensors, the sensors can work independently from each other. Alternatively, two or more of the sensors can work in combination. In such a case, the two or more sensors can form a sensor network. The sensor system 420 and/or the one or more sensors can be operatively connected to the processor(s) 410, the data store(s) 415, and/or another element of the vehicle 400 (including any of the elements shown in FIG. 6). The sensor system 420 can acquire data of at least a portion of the external environment of the vehicle 400 (e.g., nearby vehicles).

The sensor system 420 can include any suitable type of sensor. Various examples of different types of sensors will be described herein. However, it will be understood that the embodiments are not limited to the particular sensors described. The sensor system 420 can include one or more vehicle sensor(s) 421. The vehicle sensor(s) 421 can detect, determine, and/or sense information about the vehicle 400 itself. In one or more arrangements, the vehicle sensor(s) 421 can be configured to detect, and/or sense the position and orientation changes of the vehicle 400, such as based on inertial acceleration. In one or more arrangements, the vehicle sensor(s) 421 can include one or more accelerometers, one or more gyroscopes, an inertial measurement unit (IMU), a dead-reckoning system, a global navigation satellite system (GNSS), a global positioning system (GPS), a navigation system 437, and/or other suitable sensors. The vehicle sensor(s) 421 can be configured to detect, and/or sense one or more characteristics of the vehicle 400. In one or more arrangements, the vehicle sensor(s) 421 can include a speedometer to determine a current speed of the vehicle 400.

Alternatively, or in addition, the sensor system 420 can include one or more environment sensors 422 configured to acquire, and/or sense driving environment data. "Driving environment data" includes data or information about the external environment in which an autonomous vehicle is located or one or more portions thereof. For example, the one or more environment sensors 422 can be configured to detect, quantify and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400, such as, for example, lane markers, signs, traffic lights, traffic signs, lane lines, crosswalks, curbs proximate the vehicle 400, off-road objects, etc.

Various examples of sensors of the sensor system 420 will be described herein. The example sensors may be part of the one or more environment sensors 422 and/or the one or more vehicle sensor(s) 421. However, it will be understood that the embodiments are not limited to the particular sensors described.

As an example, in one or more arrangements, the sensor system 420 can include one or more radar sensors 423, one or more LIDAR sensors 424, one or more sonar sensors 425, and/or cameras 426. The cameras 426 may be the sensors responsible for generating the multi-view images utilized by the multi-view 3D object detection framework 14.

The vehicle 400 can include an input system 440. An "input system" includes any device, component, system, element, arrangement, or group that enables information/data to be entered into a machine. The input system 440 can receive an input from a vehicle passenger (e.g., a driver or a passenger). The vehicle 400 can include an output system 445. An "output system" includes any device, component, arrangement, or group that enables information/data to be presented to a vehicle passenger (e.g., a person, a vehicle passenger, etc.).

Figure 6:
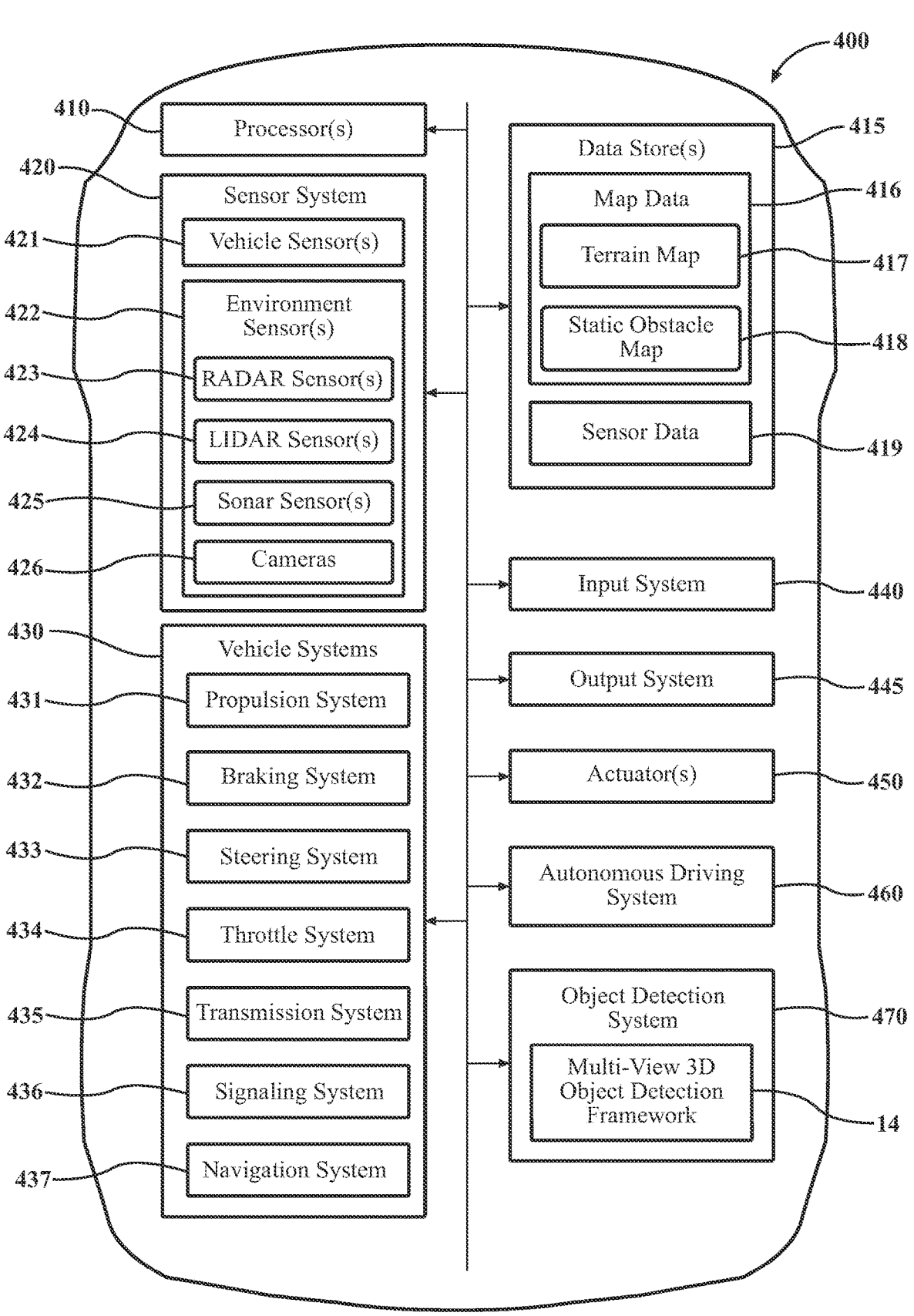
FIG. 6 illustrates one example of an implementation of a multi-view 3D object detection framework within an object detection system of a vehicle.

The vehicle 400 can include one or more vehicle systems 430. Various examples of the one or more vehicle systems 430 are shown in FIG. 6. However, the vehicle 400 can include more, fewer, or different vehicle systems. It should be appreciated that although particular vehicle systems are separately defined, each or any of the systems or portions thereof may be otherwise combined or segregated via hardware and/or software within the vehicle 400. The vehicle 400 can include a propulsion system 431, a braking system 432, a steering system 433, a throttle system 434, a transmission system 435, a signaling system 436, and/or a navigation system 437. Each of these systems can include one or more devices, components, and/or a combination thereof, now known or later developed.

The navigation system 437 can include one or more devices, applications, and/or combinations thereof, now known or later developed, configured to determine the geographic location of the vehicle 400 and/or to determine a travel route for the vehicle 400. The navigation system 437 can include one or more mapping applications to determine a travel route for the vehicle 400. The navigation system 437 can include a global positioning system, a local positioning system, or a geolocation system.

The processor(s) 110 and/or the autonomous driving system 460 can be operatively connected to communicate with the vehicle systems 430 and/or individual components thereof. For example, the processor(s) 410 and/or the autonomous driving system 460 can be in communication to send and/or receive information from the vehicle systems 430 to control the movement, speed, maneuvering, heading, direction, etc. of the vehicle 400. The processor(s) 410 and/or the autonomous driving system 460 may control some or all of these vehicle systems 430 and, thus, may be partially or fully autonomous.

The processor(s) 410 and/or the autonomous driving system 460 can be operatively connected to communicate with the vehicle systems 430 and/or individual components thereof. For example, returning to FIG. 1, the processor(s) 410 and/or the autonomous driving system 460 can be in communication to send and/or receive information from the vehicle systems 430 to control the movement, speed, maneuvering, heading, direction, etc. of the vehicle 400. The processor(s) 410 and/or the autonomous driving system 460 may control some or all of these vehicle systems 430.

The processor(s) 410 and/or the autonomous driving system 460 may be operable to control the navigation and/or maneuvering of the vehicle 400 by controlling one or more of the vehicle systems 430 and/or components thereof. For instance, when operating in an autonomous mode, the processor(s) 410 and/or the autonomous driving system 460 can control the direction and/or speed of the vehicle 400. The processor(s) 410 and/or the autonomous driving system 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 400 can include one or more actuators 450. The actuators 450 can be any element or combination of elements operable to modify, adjust and/or alter one or more of the vehicle systems 430 or components to respond to receiving signals or other inputs from the processor(s) 410 and/or the autonomous driving system 460. Any suitable actuator can be used. For instance, the one or more actuators 450 can include motors, pneumatic actuators, hydraulic pistons, relays, solenoids, and/or piezoelectric actuators, to name a few possibilities.

The vehicle 400 can include one or more modules, at least some of which are described herein. The modules can be implemented as computer-readable program code that, when executed by a processor(s) 410, implements one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively, or in addition, one or more data store(s) 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include the autonomous driving system 460. The autonomous driving system 460 can be configured to receive data from the sensor system 420 and/or any other type of system capable of capturing information relating to the vehicle 400 and/or the external environment of the vehicle 400.

The vehicle 400 can include an object detection system 470 that utilizes the multi-view 3D object detection framework 14 for object detection based on multi-view images received from the cameras 426. In one or more arrangements, the au object detection system 470 can determine the location of obstacles, obstacles, or other environmental features, including traffic signs, trees, shrubs, neighboring vehicles, pedestrians, etc.

The autonomous driving system 460 can be configured to determine travel path(s), current autonomous driving maneuvers for the vehicle 400, future autonomous driving maneuvers and/or modifications to current autonomous driving maneuvers based on data acquired by the sensor system 420, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 400, changing travel lanes, merging into a travel lane, and/or reversing, to name a few possibilities. The autonomous driving system 460 can be configured to implement determined driving maneuvers. The autonomous driving system 460 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 460 can be configured to execute various vehicle functions and/or transmit data to, receive data from, interact with, and/or control the vehicle 400 or one or more systems (e.g., one or more of vehicle systems 430).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code comprising one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or apparatus adapted for the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. For example, "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for supervised training a multi-view 3D object detection framework comprising:
   predicting one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, wherein the geometric positional encodings are generated from pixel locations of the associated feature embeddings, camera poses of the multi-view cameras that captured the multi-view images, and intrinsics of the multi-view cameras, and are mathematically combined with the feature embeddings;
   determining a viewpoint equivariance loss based on a comparison of the one or more predicted bounding boxes with one or more ground truth bounding boxes; and
   adjusting model weights of networks forming the multi-view 3D object detection framework based on the viewpoint equivariance loss.

2. The method of claim 1, further comprising determining the viewpoint equivariance loss by matching the one or more predicted bounding boxes with a same query point combined with multiple query views to one or more ground truth bounding boxes in respective views and pay the viewpoint equivariance loss to enforce multi-view consistency.

3. The method of claim 1, wherein pixel location is in the form of a 3D viewing ray originating from a camera center and pointing to the image feature, the 3D viewing ray being calculated from intrinsics of the camera.

4. The method of claim 1, further comprising generating the view-dependent queries using a query encoding network that considers learnable 3D query points combined with a given query view.

5. The method of claim 1, further comprising generating the feature embeddings using an image encoder that extracts the image features from multi-view images and flattens the image features to become the feature embeddings considered by the decoder.

6. The method of claim 1, further comprising generating updated view-dependent queries using a decoder network that includes self-attention layers and cross-attention layers, wherein the self-attention layers perform self-attention among the view-dependent queries and the cross-attention layers perform cross attention between the view-dependent queries and the feature embeddings and the geometric positional encodings to generate the updated view-dependent queries.

7. The method of claim 6, further comprising generating the one or more predicted bounding boxes using a feed-forward detection head that maps the updated view-dependent queries to the one or more predicted bounding boxes.

8. The method of claim 7, wherein the feed-forward detection head is part of the decoder network.

9. A system for supervised training a multi-view 3D object detection framework comprising:
   a processor; and
   a memory in communication with the processor, the memory including a training module having instructions that, when executed by the processor, cause the processor to:
      predict one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, wherein the geometric positional encodings are generated from pixel locations of the associated feature embeddings, camera poses of the multi-view cameras that captured the multi-view images, and intrinsics of the multi-view cameras, and are mathematically combined with the feature embeddings,
      determine a viewpoint equivariance loss based on a comparison of the one or more predicted bounding boxes with one or more ground truth bounding boxes, and
      adjust model weights of networks forming the multi-view 3D object detection framework based on the viewpoint equivariance loss.

10. The system of claim 9, wherein the training module further includes instructions that, when executed by the processor, cause the processor to determine the viewpoint equivariance loss by matching the one or more predicted bounding boxes with a same query point combined with multiple query views to one or more ground truth bounding boxes in respective views and pay the viewpoint equivariance loss to enforce multi-view consistency.

11. The system of claim 9, wherein pixel location is in the form of a 3D viewing ray originating from a camera center and pointing to the image feature, the 3D viewing ray being calculated from intrinsics of the camera.

12. The system of claim 9, wherein the training module further includes instructions that, when executed by the processor, cause the processor to generate the view-dependent queries using a query encoding network that considers learnable 3D query points combined with a given query view.

13. The system of claim 9, wherein the training module further includes instructions that, when executed by the processor, cause the processor to generate the feature embeddings using an image encoder that extracts the image features from multi-view images and flattens the image features to become the feature embeddings considered by the decoder.

14. The system of claim 9, wherein the training module further includes instructions that, when executed by the processor, cause the processor to generate updated view-dependent queries using a decoder network that includes self-attention layers and cross-attention layers, wherein the self-attention layers perform self-attention among the view-dependent queries and the cross-attention layers perform cross attention between the view-dependent queries and the feature embeddings and the geometric positional encodings to generate the updated view-dependent queries.

15. The system of claim 14, wherein the training module further includes instructions that, when executed by the processor, cause the processor to generate the one or more predicted bounding boxes using a feed-forward detection head that maps the updated view-dependent queries to the one or more predicted bounding boxes.

16. The system of claim 15, wherein the feed-forward detection head is part of the decoder network.

17. A non-transitory computer-readable medium storing instructions for supervised training a multi-view 3D object detection framework that, when executed by a processor, cause the processor to:
   predict one or more predicted bounding boxes representing one or more objects within multi-view images using a decoder that considers (a) feature embeddings generated from image features from multi-view images, (b) geometric positional encodings that are associated with the feature embeddings, and (c) view-dependent queries, wherein the geometric positional encodings are generated from pixel locations of the associated feature embeddings, camera poses of the multi-view cameras that captured the multi-view images, and intrinsics of the multi-view cameras, and are mathematically combined with the feature embeddings;
   determine a viewpoint equivariance loss based on a comparison of the one or more predicted bounding boxes with one or more ground truth bounding boxes; and
   adjust model weights of networks forming the multi-view 3D object detection framework based on the viewpoint equivariance loss.

18. The non-transitory computer-readable medium of claim 17, further including instructions that, when executed by the processor, cause the processor to determine the viewpoint equivariance loss by matching the one or more predicted bounding boxes with a same query point combined with multiple query views to one or more ground truth bounding boxes in respective views and pay the viewpoint equivariance loss to enforce multi-view consistency.

* * * * *